(12) United States Patent
Kinebuchi et al.

(10) Patent No.: US 7,415,750 B2
(45) Date of Patent: Aug. 26, 2008

(54) CORD STOPPER

(75) Inventors: Shinichiro Kinebuchi, Taipei (TW); Natsuko Saitsu, Kurobe (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 11/507,100

(22) Filed: Aug. 21, 2006

(65) Prior Publication Data
US 2007/0044278 A1    Mar. 1, 2007

(30) Foreign Application Priority Data
Aug. 31, 2005    (JP)    ............................. 2005-250636

(51) Int. Cl.
*F16G 11/00*    (2006.01)
*A44B 21/00*    (2006.01)
(52) U.S. Cl. .................... 24/115 G; 24/712.5
(58) Field of Classification Search ............... 24/115 G, 24/115 R, 132 R, 132 AA, 115 A, 134 L, 24/712.1, 712.2, 712.5, 712.7; 36/50.1
See application file for complete search history.

(56) References Cited
U.S. PATENT DOCUMENTS
1,229,855 A * 6/1917 Alexander ................ 24/115 G
1,725,748 A * 8/1929 Alexander ................ 24/115 G
4,852,223 A * 8/1989 McCreary ................ 24/712.7
5,193,252 A * 3/1993 Svehaug ................ 24/115 G
7,257,865 B2 * 8/2007 Kaneko et al. ............ 24/115 G

FOREIGN PATENT DOCUMENTS
JP    2005-58583    3/2005

* cited by examiner

*Primary Examiner*—Robert J Sandy
(74) *Attorney, Agent, or Firm*—Alston & Bird LLP

(57) ABSTRACT

A cord stopper (3A~3E) comprises a locking member (10A~10E) adapted to be normally in locking engagement with a cord (2, 2A~2C) and, when the locking member (10A~10E) is pressed, to come out of locking engagement with the cord (2, 2A~2C); and a housing member (30A~30E) including a housing member proper (31A~31E) adapted for housing the locking member (10A~10E) therein and attached to an article (1). The housing member proper (31A~31E) has a housing space (37, 37E) large enough to substantially accommodate the locking member (10A~10E). Pressure applied to the housing member proper (31A~31E) can be transmitted to the locking member (10A~10E) through an outer wall of the housing space (37, 37E).

2 Claims, 13 Drawing Sheets

CORD STOPPER

BACKGROUND

1. Field of the Invention

This invention relates to a cord stopper for fixing any part of a cord to an article and particularly to a cord stopper comprising a locking member capable of normally be locking engagement with a cord, and coming out of locking engagement with the cord when the locking member is pressed, and a housing member adapted to house the locking member therein and attached to the article.

2. Description of the Related Art

A cord stopper is used for binding and releasing an opening of a sleeve of a garment or an opening of a bag. A conventional cord stopper is comprised of a cylindrical female member and a male member reciprocally mounted in the cylindrical female member. The male member is normally urged by separate urging means or urging means integrally formed with the male member in the direction tending to coming out of the female member. The female member and the male member have the respective through holes. Thrusting the male member into the cylindrical female member against the resiliency of the urging means brings the holes of the male and female members into registry or registration with each other, thus permitting the cord to pass through the holes freely. Releasing the hold of the male member restores the male member, under the resiliency of the urging means, to its original position where the hole of the male member and the hole of the female member are out of registry with each other, thus bringing the cord in locking engagement with the cord stopper.

Usually, a cord whose one end is attached to a garment is inserted through such a cord stopper, which cord stopper is locked at any place adjacent to the other end of the cord in use, so that the cord stopper dangles with the cord. When the cord stopper dangles, the cord stopper is likely to touch the skin of the wearer or catch extraneous things, thus hindering the proper movement of the cord stopper. Furthermore, when the cord stopper dangles, the cord stopper is likely to touch or collide against extraneous things and be broken, so that the cord stopper loses its proper function as such.

Furthermore, the cord stopper is made of relatively rigid materials such as acetal on account of necessity of firmly locking the cord. Therefore, there is another problem that, if such a rigid cord stopper is attached to a garment and the cord stopper touches the skin directly or through the garment fabric, the cord stopper feels offensive to the skin.

In order to prevent a cord stopper from dangling, there has been proposed a method that a cord stopper is housed in a housing member sewn to a garment, as indicated in Japanese Patent Laid-open Application No. 2005-58583.

The cord stopper shown in the publication is comprised of a cylindrical female member, a male member reciprocally mounted in the female member, and urging means for urging the male member in the direction tending to come out of the female member. The male member and the female member have through holes formed respectively therethrough. The female member has a rim formed thereon for sewing the female member to a garment.

Although the cord stopper disclosed in the publication can solve the problem that the cord stopper dangles, it still suffers from another problem. Since the male member protrudes out of the female member, the projecting part of the male member touches or catches extraneous things, and is likely to damage the wearer himself or extraneous things. Moreover, since the male member protrudes out of the female member, the cord stopper is less attractive in design or appearance.

Therefore, the object of this invention is to provide a cord stopper which is well prevented from touching or catching extraneous things, thus less likely to damage the wearer himself or extraneous things, and is attractive in appearance as well.

SUMMARY

In accordance with the present invention, a cord stopper comprises a locking member adapted to be normally in locking engagement with a cord and, when the locking member is pressed, to come out of locking engagement with the cord; and a housing member including a housing member proper adapted for housing the locking member therein and attached to an article. The housing member proper has a housing space large enough to substantially accommodate the locking member. Pressure applied to the housing member proper can be transmitted to the locking member through an outer wall of the housing space.

DETAILED DESCRIPTION OF THE INVENTION

Figure 1:
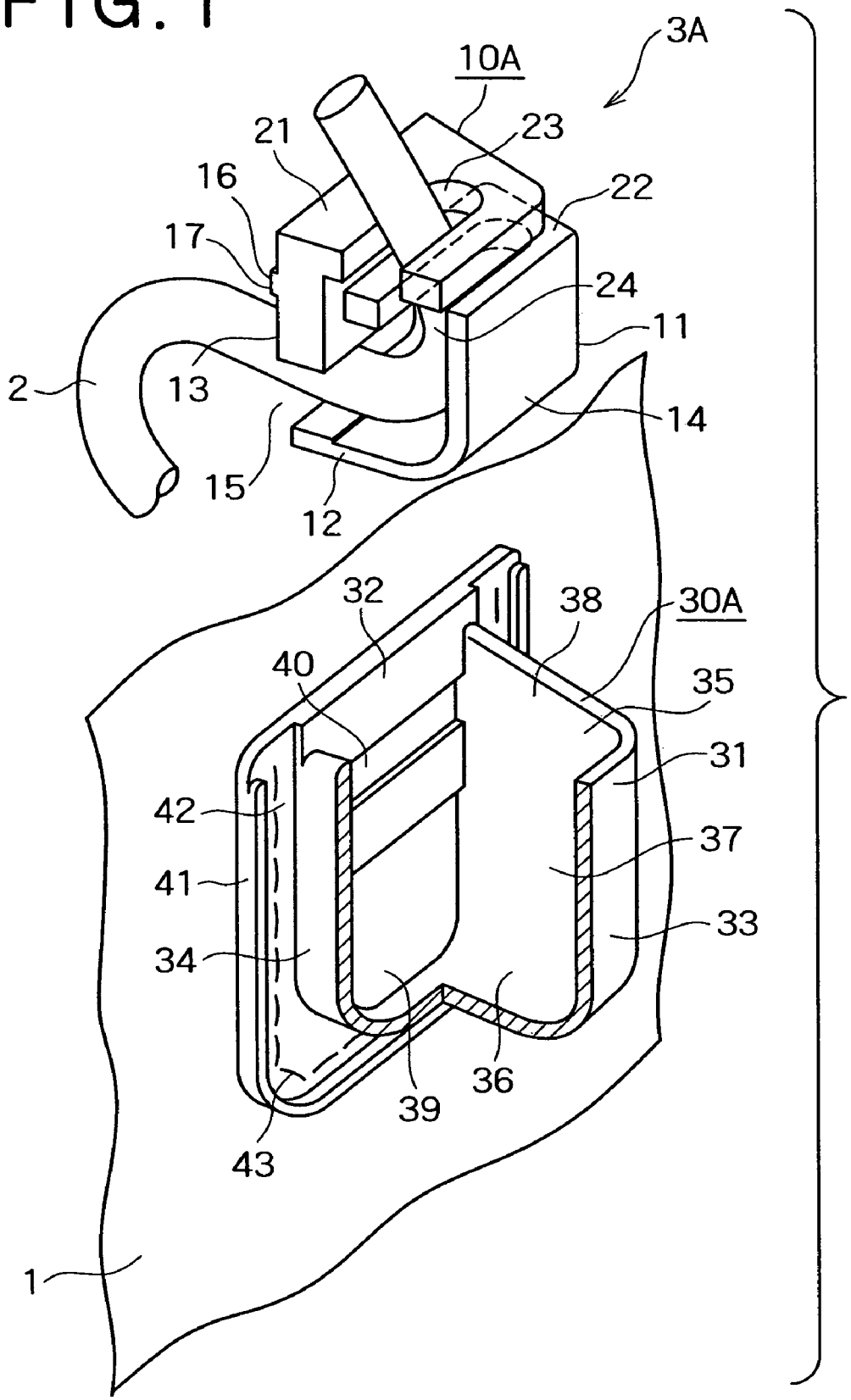
FIG. 1 is an exploded perspective view showing a cord stopper according to the first embodiment of this invention.

Preferred embodiments of the present invention will be described below in conjunction with the drawings appended hereto. When describing the embodiments, the same reference numerals will be affixed to the same parts. The description of the same parts already described will be omitted.

The first embodiment of the present invention will be shown in FIGS. 1 through 4.

FIG. 1 is an exploded perspective view of a cord stopper according to the first embodiment of the present invention.

As shown in FIG. 1, the cord stopper 3A according to the first embodiment is comprised of a locking member 10A attached to a cord 2 which is in turn attached to an article 1 such as a garment; and a housing member 30A attached to the article 1 and adapted to house the locking member 10A therein.

If the article 1 is a garment, the cord 2 is provided along the edge of an opening such as a sleeve opening. An end of the cord 2 comes outward or inward through a hole formed in the article 1.

The locking member 10A is formed of relatively rigid materials such as polyacetal, polyamide, polypropylene, ABS resin, polycarbonate, etc. The housing member 30A is made of materials relatively softer and elastic (than that of the locking member 10A), such as polyurethane elastomer, olefin elastomer, polyester elastomer.

The locking member 10A includes a U-shaped locking body 11 and a pair of clamping plates 21, 22 provided on the opposed ends of the locking body 11 so as to be bent towards the respective other ends, the U-shaped locking body 11 and the clamping plates 21, 22 being formed integrally with each other.

The U-shaped locking body 11 comprises a bottom connecting wall 12 and two opposed side walls 13, 14 connected at their respective lower ends by the bottom connecting wall 12, to thus looks like U-shape as viewed sidewise. One 13 of the two opposed side walls 13, 14 has a cord-inserting slit 15 formed adjacent to the connecting wall 12 and has a rectangular-cross-sectioned locking ridge 16 integrally formed on its outer surface. The cord-inserting slit 15 is open on one side of the side wall 13, that is, at one end of the slit 15.

The clamping plates 21, 22 are provided on the opposed upper ends the opposed side walls 13, 14 of the locking body 11 so as to be bent towards the respective other ends and partly overlap each other perpendicularly of the plane of the article 1. The clamping plates 21, 22 have cord-inserting slits 23, 24 formed therein closer to the opposed side walls 13, 14, respectively. The slits 23, 24 are open at their one end in one side of clamping plates 21, 22, respectively. Preferably, the slits 23, 24 are open in the same direction where the cord-inserting slit is open.

The locking body 11 constitutes a second elastically deformable portion which is capable of elastically displacing the clamping plates 21, 22 in such a direction as to bring their cord-inserting slits 23, 24 into registry with each other. With this construction, the locking member 10A is normally capable of coming into engagement with the cord 2 and, when the opposed side walls 13, 14 of the locking body 11 are compressed towards each other, the locking member 10A is capable of coming out of engagement with the cord 2.

As shown in FIG. 1, the housing member 30A is comprised of a housing member proper 31 adapted for housing the locking member 10A therein and an attaching rim 41 formed integrally around the boundary of the housing member proper 31 and adapted to attach the housing member 30A to the article 1.

The housing member proper 31 is comprised of the first through fourth side walls 32, 33, 34, 35 and a bottom wall 36 formed on the upper or lower ends of the four side walls 32, 33, 34, 35 to thus define a housing space 37 large enough to substantially house the locking member 10A therein. The first side wall 32 and the third side wall 34 are opposed to the second side wall 33 and the fourth side wall 35, respectively. The housing space 37 is formed slightly smaller than the outer shape of the locking member 10A. The housing space 37 has an opening 38 formed at the end opposite to the bottom wall 36, so that the locking member 10A can be inserted into the housing space 37 through the opening 38. Thus, the locking member 10A is enclosed by the housing member 30A with the side walls 13, 14 of the locking member 10A facing the first and second side walls 32, 33, respectively, of the housing member 30A. The first and second side walls 32, 33 facing the side walls 13, 14 respectively, of the locking member 10A are opposed to each other, with the housing space 37 interposed therebetween, The clamping plates 21 of the locking member 10A is exposed to view.

The first through fourth side walls 32, 33, 34, 35 except the first side wall 32, that is, the three side walls 33 through 35 are formed of such thickness and shape as to elastically deform into the housing space 37 when they are compressed. These three side walls 33 through 35 constitute a first elastically deformable portion so that pressure applied to the housing member 30A can be transmitted through the outer wall of the housing space 37 to the locking member 10A. The first side wall 32 that is held on the article 1 has a hole 39 formed adjacent to the bottom wall 36 and has a locking hole 40 formed adjacent to the opening 38. The hole 39 communicates with the inside of the article 1 and is intended to lead a cord 2 housed in the housing member proper 31 therethrough to the inner side of the article 1. When the locking member 10A is housed into the housing member proper 31, the locking ridge 16 comes into engagement with the locking hole 40.

In other words, the locking ridge 16 and the locking hole 40 constitute retaining means 17 for retaining the locking member 10A within the housing member proper 31.

The attaching rim 41 is formed integrally along the outer edges of the third side wall 34, the fourth side wall 35 and the bottom wall 36 of the housing member proper 31 in coplanar relation with the first side wall 32. The attaching rim 41 has a groove 42 formed therealong centrally relative to its width. The groove 42 is intended to permit sewing stitches to run therethrough when the attaching rim 41 is sewn to the article 1.

Figure 2:
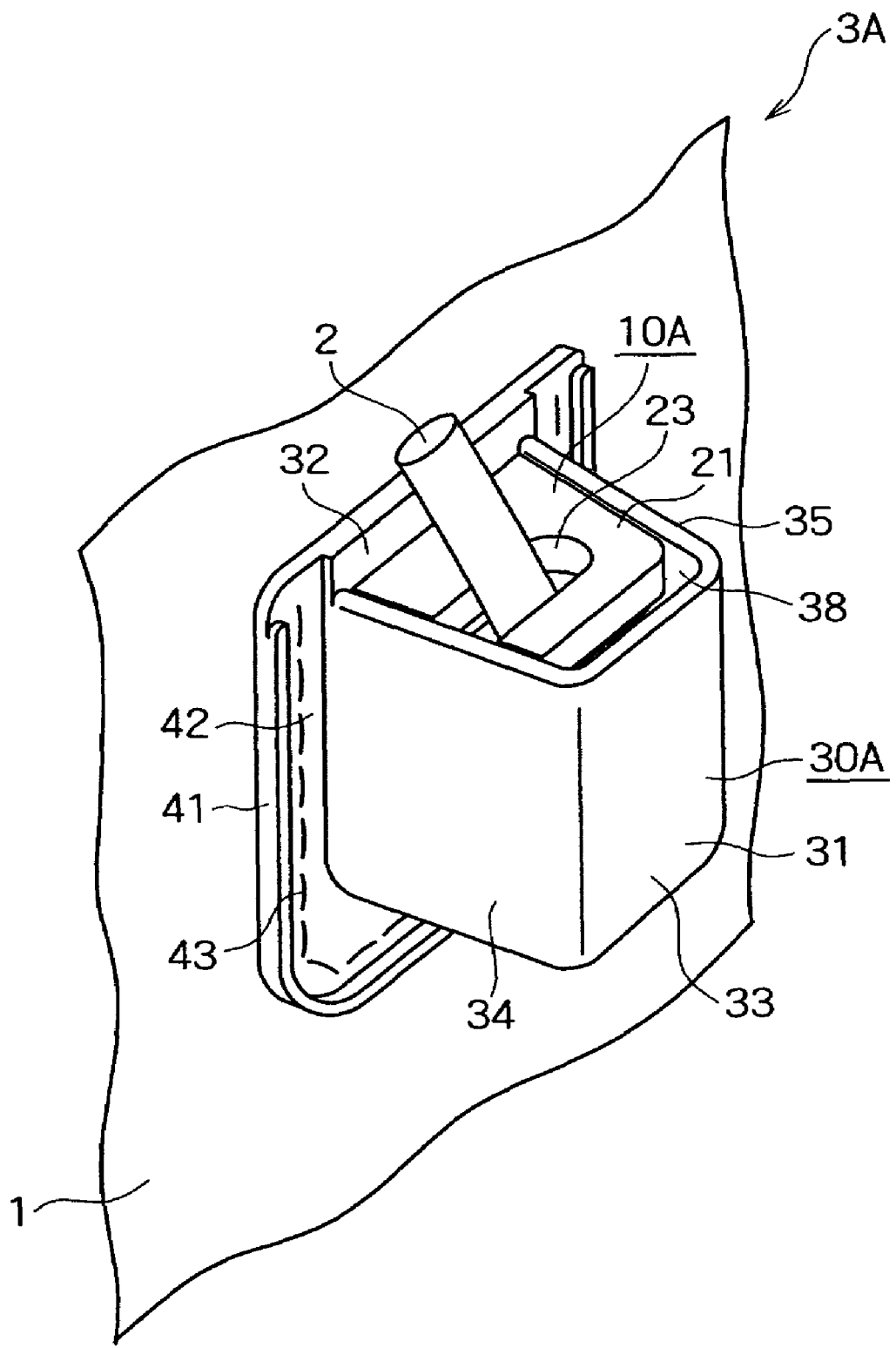
FIG. 2 is a perspective view of the same embodiment of this invention, showing the locking member housed in the housing member.

FIG. 2 is a perspective view showing the locking member 10A housed into the housing member 30A. In order to house the locking member 10A into the housing member 30A; for example, the following steps should be taken.

(a) The housing member 30A is sewn to the article 1. Specifically, the attaching rim 41 of the housing member 30A are sewn along the groove 42 thereof to the article 1.

(b) The cord 2 attached to the article 1 is inserted through the hole 39, the housing member proper 31 and the opening 38 to the inside or outside of the article 1.

(c) Then, one end of the cord 2 is passed through the cord-inserting slits 23, 24 of the locking member 10A. It is to be noted that since the cord-inserting slits 23, 24 are open at their one ends, the cord 2 is easy to be inserted through the slits 23, 24. Furthermore, for the same reason, the slits 23, 24 are easy to make.

(d) Thereafter, the locking member 10A is housed into the housing member proper 31. It is to be also noted that the housing member 30A is made of elastic materials, and that the housing member proper 31 of the housing member 30A has a housing space 37 which is slightly smaller than the outer dimension of the locking member 10A. With this construction, the locking member 10A is housed into the housing member proper 31 with the housing member proper 31 stretched or expanded.

(e) As soon as the locking member 10A is housed into the housing member proper 31, the locking ridge 16 of the locking member 10A comes into engagement with the locking hole 40 of the housing member 30, thus preventing the locking member 10A from accidentally coming out of the housing member proper 31.

(f) Furthermore, the opening 38 of the housing member proper 31 is closed by the pair of clamping plates 21, 22, so that the housing member proper 31 will leave no recess. This will prevent extraneous things from catching the housing member proper 31, thus diminishing the likelihood of the housing member proper 31 being damaged.

Figure 3:
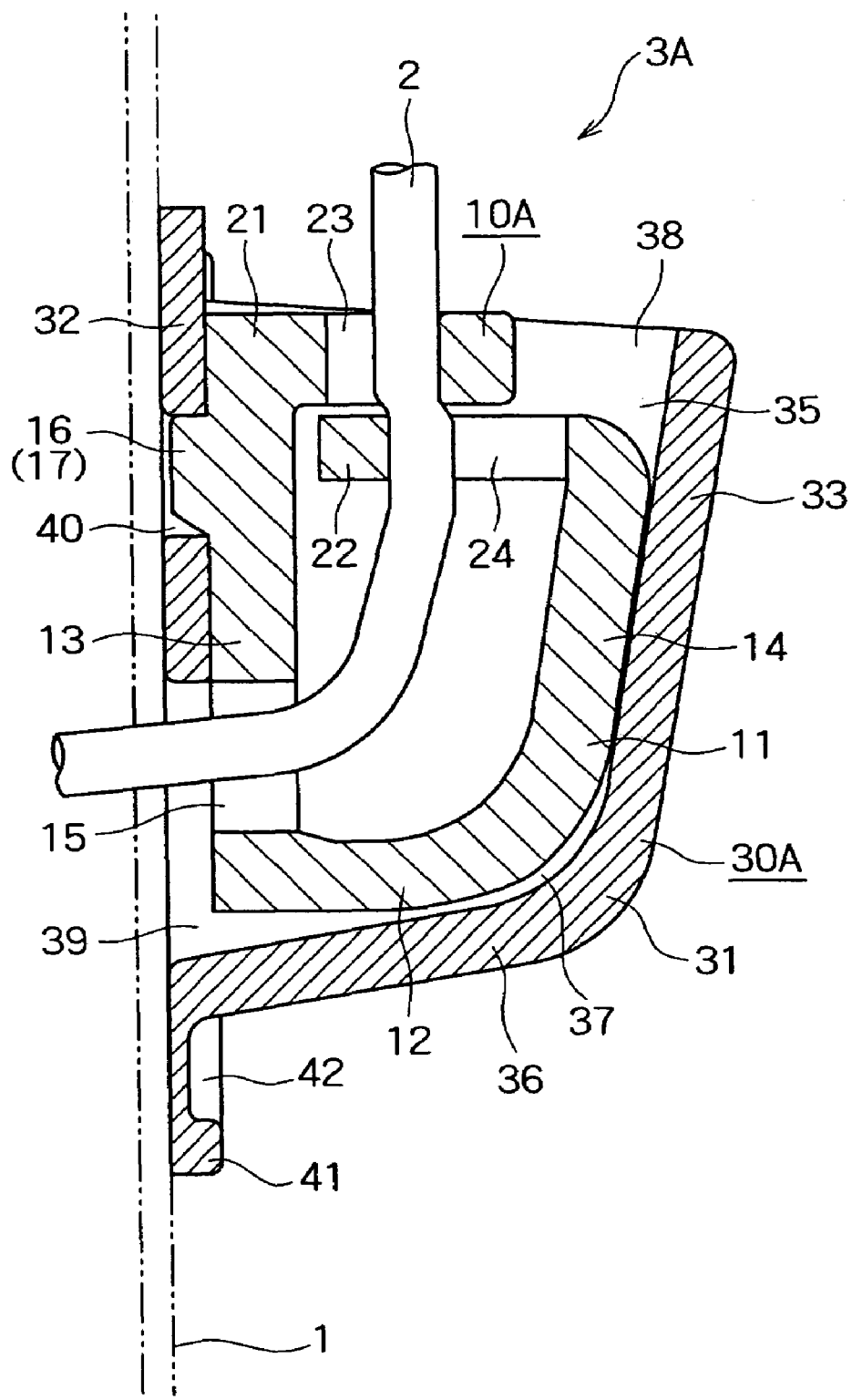
FIG. 3 is a cross-sectional view of the same embodiment of this invention, showing the locking member housed in the housing member.

FIG. 3 is a cross-sectional view showing the locking member 10A housed in the housing member 30A. When the locking member 10A is housed in the housing member 30A, the cord-inserting slits 23, 24 of the two clamping plates 21, 22, respectively, are out of registry with each other. The overlap of the cord-inserting slits 23, 24 are smaller than the thickness of the cord 2, so that the cord 2 will be constrained or retained by the overlap of the cord-inserting slits 23, 24. This state is defined as a normal state.

Figure 4:
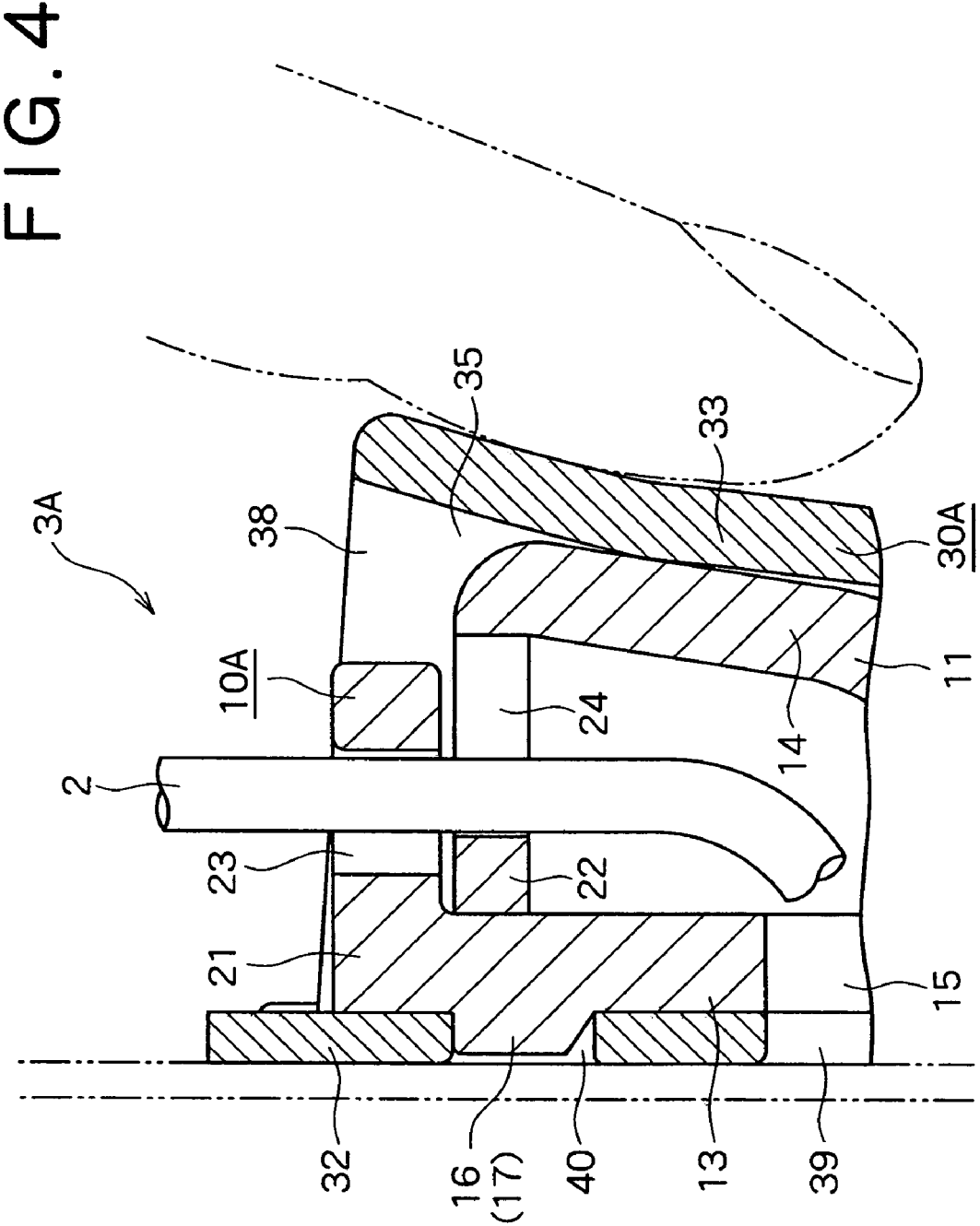
FIG. 4 is a fragmentary enlarged view of FIG. 3, showing how to bring the cord out of engagement with the cord stopper.

FIG. 4 is a fragmentary enlarged view of FIG. 3, showing the operation to release the cord 2 from the cord stopper 3A.

In order to release the cord 2 from the cord stopper 3A, the second side wall 33 of the housing member proper 31 and hence the locking body 11 of the locking member 10A housed in the housing member proper 31 are pressed together inward or towards the first side wall 32. Pressing the second side wall 33 of the housing member proper 31 towards the first side wall 32 will elastically deform the second side wall 33 into the housing member proper 31. When the second side wall 33 is elastically deformed into the housing member proper 31, the side wall 14 of the locking member 10A housed in the housing member proper 31 deforms toward the opposed side wall 13. Consequently, the pair of clamping plates 21, 22 come toward each other, so that the overlap of the cord-inserting slits 23, 24 grows greater to thus permit the cord 2 to pass therethrough freely. However, the overlap of the slits 23, 24 not be necessarily greater than the thickness of the cord 2. If the overlap grows slightly greater than it is when the cord 2 is constrained, the cord 2 can pass through the overlap under abrasion.

According to the first embodiment of the present invention, the following advantageous effects are obtained:

(1) Since the locking member 10A is completely housed within the housing space 37 of the housing member proper 31, there is no sticking part, so that there is little risk that the cord stopper contacts or catches any extraneous thing, thus causing damages thereupon.

Furthermore, when the locking member 10A is housed in the housing member proper 31, the opening 38 of the housing member proper 31 is closed or filled up by the clamping plates 21, 22, so that the there remains no recess in the housing member proper 31. This also means that there is no sticking part so that there is little risk that the cord stopper contacts or catches any extraneous thing, thus suffering damages.

Still furthermore, in appearance, only a housing member proper 31 appears outside, thus giving a simple impression upon the viewers, so that the cord stopper is excellent in design. Since the housing member 30A is firmly attached to the garment 1, the cord stopper 3A will never dangle, thus causing no attendant troubles.

(2) In order to bring the cord 2 into and out of engagement with the cord stopper 3A with the locking member 10A housed in the housing member proper 31, the side wall 33 of the housing member proper 31 is pressed towards the opposed side wall 32, and then the side wall 33 is elastically deformed into the housing member proper 31. Then, the side wall 14 of the locking member 10A housed in the housing member proper 31 is elastically deformed towards the opposed side wall 13, whereby the pair of clamping plates 21, 22 of the locking member 10A comes towards each other. As a result, the overlap of the cord-inserting slits 23, 24 becomes greater, thus permitting the cord 2 to pass freely therethrough.

Releasing pressure from the side wall 33 of the housing member proper 31 restores the side wall 33 and hence the clamping plate 22 into their original positions. As a result, the overlap of the cord-inserting slits 23, 24 becomes less, thus constraining or retaining the cord 2 between the cord-inserting slits 23, 24.

Therefore, this invention provides the cord stopper which can come into and out of locking engagement with the cord without any hindrance even when the locking member 10A is housed in the housing member proper 31, which is less likely to suffer from damages and which is attractive in appearance.

(3) Once the locking member 10A is housed in the housing member proper 31, the locking member 10A is firmly retained within the housing member proper 31 by the retaining means 17, so that the locking member 10A is well prevented from coming off the housing member proper 31 accidentally.

The retaining means 17 is comprised of the locking hole 40 formed in the housing member 30A and the locking ridge 16 formed on the locking member 10A and adapted for fitting engagement with the locking hole 40. The locking ridge 16 can accomplish secure engagement with the locking hole 40.

Furthermore, partly because the housing space 37 of the housing member proper 31 is slightly less than the outer shape of the locking member 10A and partly because the housing member proper 31 or the housing member 30A is made of elastic materials; when the locking member 10A is housed within the housing space 37, the housing space 37 stretches and intimately contacts the outer surfaces of locking member 10A. Resiliency of the housing member proper 31 made of the elastic materials enables the housing member proper 31 to more reliably retain the locking member 10A therein.

(4) The housing member 30A has the attaching rim 41 formed around the housing member proper 31 for attaching the housing member 30A to the article 1. Thanks to the presence of the attaching rim 41, the housing member 30A can be attached easily to the article 1. Particularly, the attaching rim 41 has a groove or thinned portion 42 formed centrally relative to its width. Consequently, the housing member 30A can be attached to the article 1 very easily, simply by sewing the attaching rim 41 to the article 1 with stitches 43 running along the groove 42 of the attaching rim 41.

(5) The locking member 10A is comprised of the pair of clamping plates 21, 22 having the respective cord-inserting slits 23, 24 formed therethrough and partly overlapped to each other, and the locking body 11 integrally formed with the clamping plates 21, 22 and being elastically deformable to displace the clamping plates 21, 22 in such a direction as to bring the cord-inserting slits 23, 24 into registry with each other when the locking member 10A is compressed. These clamping plates 21, 22, and the locking body 11 are formed as one thing. In other words, the locking member 10A to be housed in the housing member proper 31 is formed as one thing. With this construction, the cord stopper 3A can be formed compact.

The second embodiment of the present invention is shown in FIGS. 5 through 8.

Figure 5:
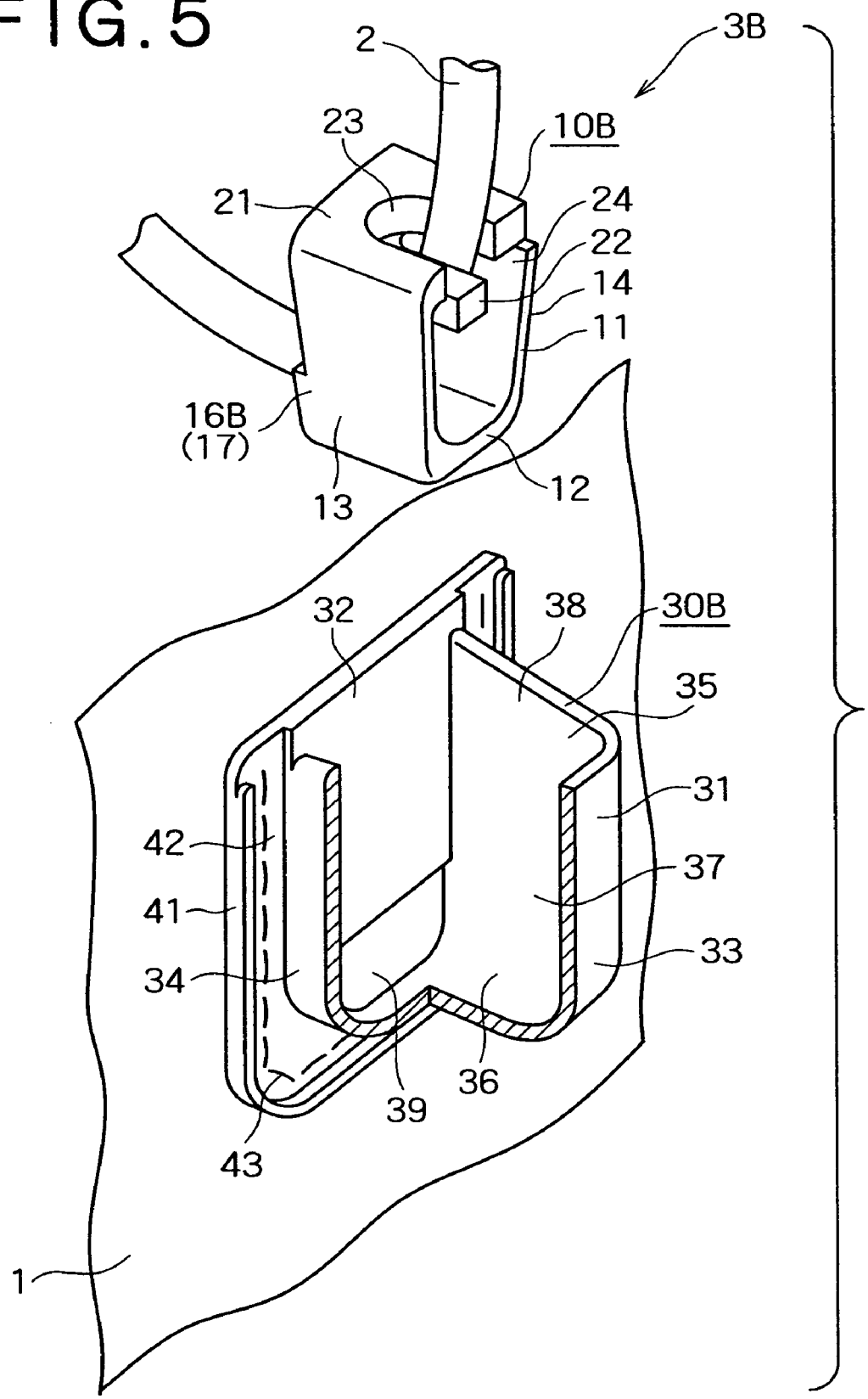
FIG. 5 is an exploded perspective view showing a cord stopper according to the second embodiment of this invention.

FIG. 5 is an exploded perspective view showing the cord stopper 3B according to the second embodiment of the present invention.

The cord stopper 3B according to the second embodiment is different from the cord stopper 3A according to the first embodiment in the following points:

The opposed side walls 13, 14 of the locking member 10B according to the second embodiment is angularly oriented by 90 degrees relative to the opposed side walls 13, 14 of the locking member 10A according to the first embodiment. With this construction, when the opposed third and fourth side walls 34, 35 of the housing member proper 31 are pressed towards each other with this locking member 10B housed in the housing member proper 31, the opposed side walls 13, 14 elastically deform and bend towards each other. The third and fourth side walls 34, 35 facing the side walls 13, 14, respectively, of the locking member 1 are opposed to each other, with the housing space 37 interposed therebetween. The cord-inserting hole 15 existent in the locking member 10A so as to communicate with the hole 39 of the housing member 30A according to the first embodiment does not exist in the locking member 10B according to the second embodiment. Thus, instead of passing through the cord-inserting hole 15, the cord 2 passes through an inside valley of the U-shaped locking body 11. Furthermore, another difference is that the locking ridge 16B is formed on that side of the locking body 11 through which the cord 2 passes.

A still another difference is that, according to the second embodiment, the housing member 30B does not have a locking hole 40 in addition to the hole 39, unlike the housing member 30A according to the first embodiment. In the second embodiment, the hole 39 serve as the locking hole 40 as well.

Figure 6:
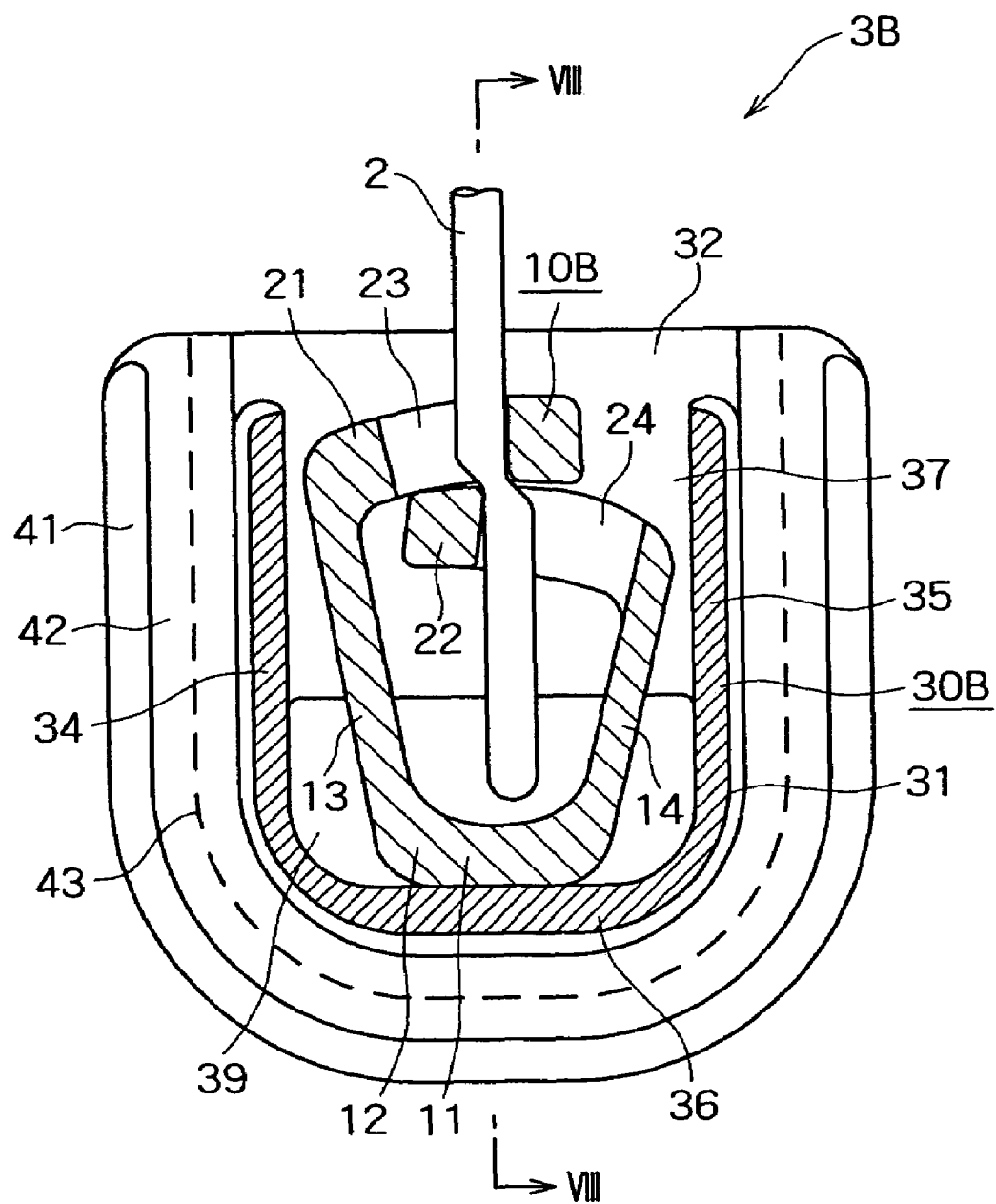
FIG. 6 is a cross-sectional view of the second embodiment of this invention, showing the locking member housed in the housing member.

FIG. 6 is a cross-sectional view showing the locking member 10B housed in the housing member 30B.

When the locking member 10B is housed within the housing member 30B, the cord-inserting slits 23, 24 of the two clamping plates 21, 22 are disposed out of registry with each other. Since the overlap of the cord-inserting slits 23, 24 is less than the thickness of the cord 2, the cord 2 passing through the cord-inserting slits 23, 24 is restrained or retained in the overlap of the cord-inserting slits 23, 24. This state is defined as a normal state.

Figure 7:
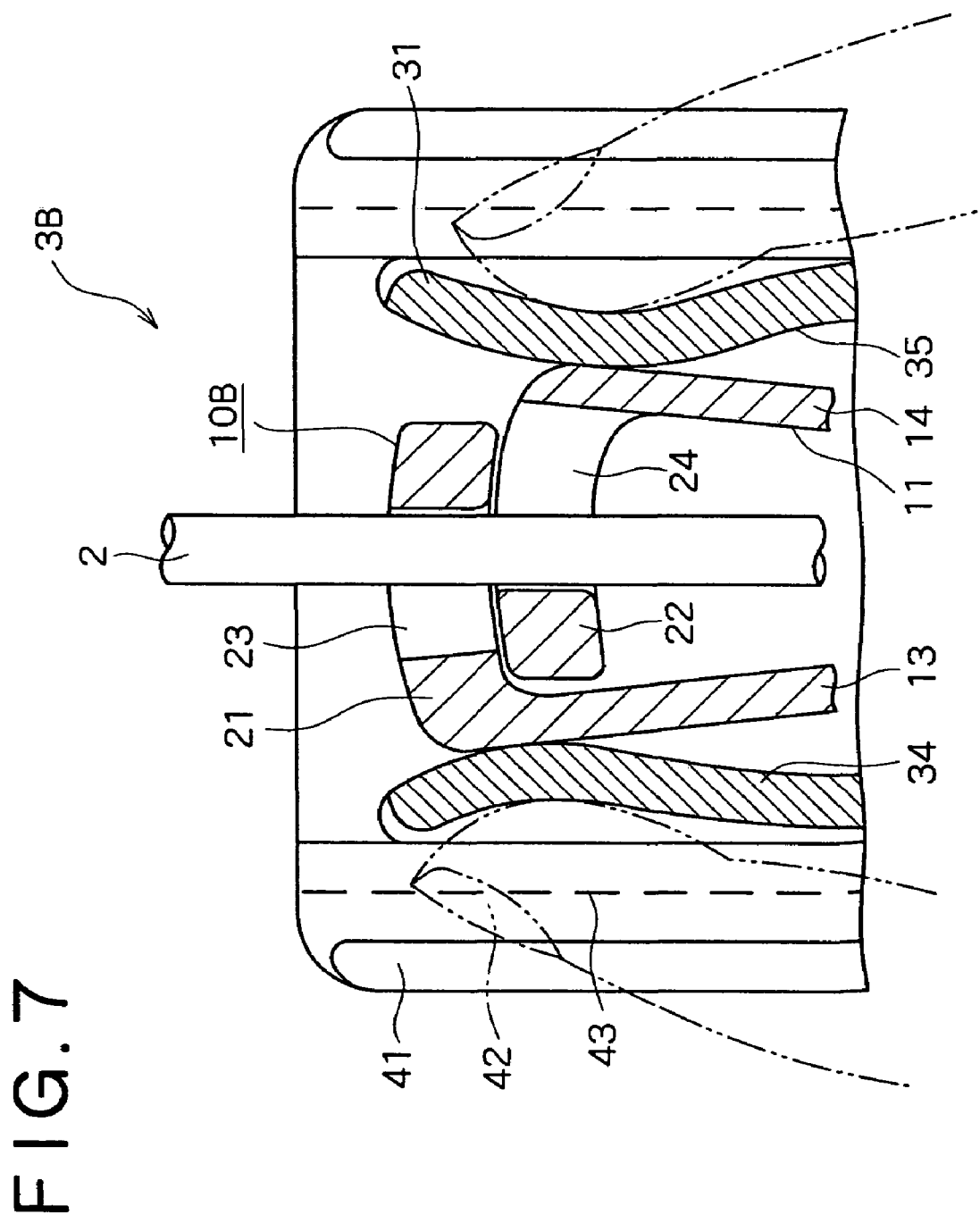
FIG. 7 is a fragmentary enlarged view of FIG. 6, showing how to bring the cord out of engagement with the cord stopper.

FIG. 7 is a fragmentary enlarged view of FIG. 6, showing the operation to release the cord 2 from the cord stopper 3B.

In order to release the cord 2 from the cord stopper 3B, the third and the fourth side walls 34, 35 of the housing member proper 31 and hence the locking body 11 of the locking member 10B housed in the housing member proper 31 are compressed together. Pressing the third and fourth side walls 34, 35 of the housing member proper 31 towards each other elastically deforms the third and fourth side walls 34, 35 inward of the housing member proper 31, thus elastically deforming the opposed side walls 13, 14 of the locking member 10B housed in the housing member proper 31 towards each other. Consequently, the pair of clamping plates 21, 22 of the locking member 10B are displaced towards each other and the overlap of the cord-inserting slits 23, 24 becomes greater, thus permitting the cord 2 to freely pass therethrough.

With the construction of the cord stopper 3B according to the second embodiment, the cord 2 can come into or out of engagement with the cord stopper 3B simply by gripping and compressing the opposed side walls 34, 35 of the housing member proper 31 by fingers, so that the cord stopper 3B is very easy to operate.

Figure 8:
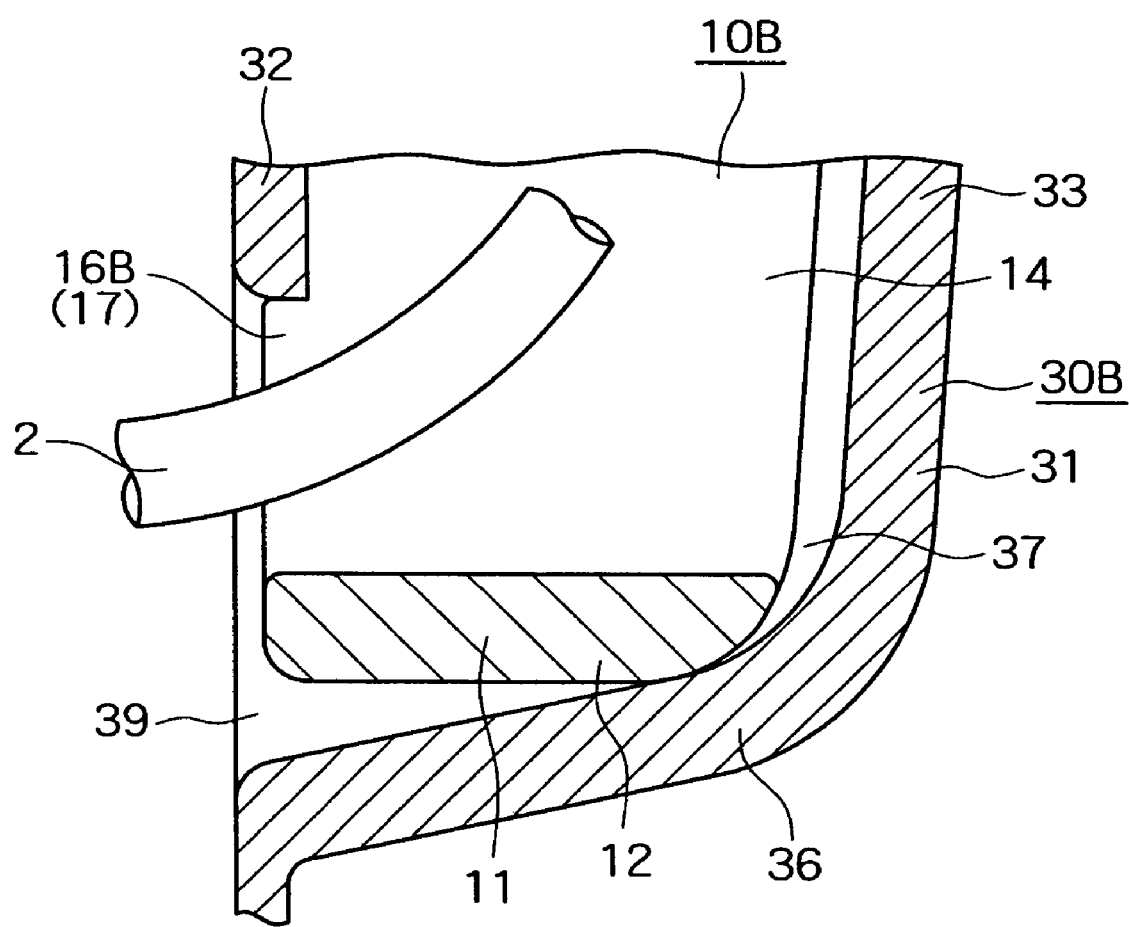
FIG. 8 is a cross-sectional view taken on line VIII-VIII of FIG. 6.

FIG. 8 is a cross-sectional view taken on line VIII-VIII of FIG. 6, showing the locking member 10B housed in the housing member 30B.

When the locking member 10B is housed within the housing member 30B, the locking ridge 16B provided on the locking member 10B comes into fitting engagement with the hole 39 formed in the housing member 30B. The cord 2 is pulled through the cord-inserting slits 23, 24 of the locking member 10B and then inserted through the hole 39 of the housing member 30B into the article 1.

According to the second embodiment, a separate locking hole intended for coming into locking engagement with the locking ridge 16B need not be formed in the housing member 30B in addition to the hole 39 intended for passing the cord 2 therethrough.

Figure 9:
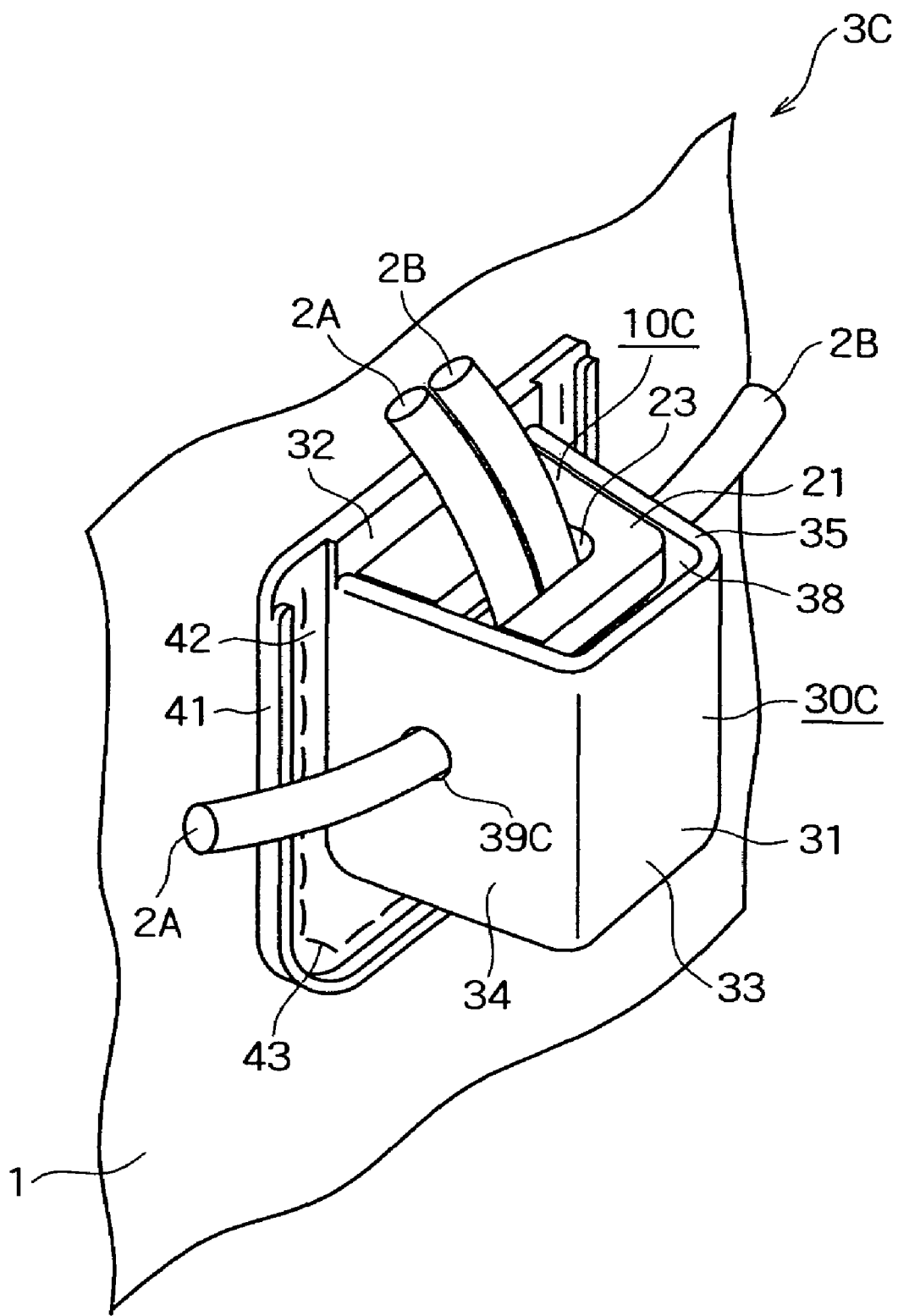
FIG. 9 is a perspective view showing a cord stopper according to the third embodiment of this invention.

FIG. 9 shows the third embodiment of this invention. FIG. 9 is a perspective view showing a cord stopper 3C according to the third embodiment to be housed in the housing member 30C.

The cord stopper 3C according to the third embodiment differs from the cord stoppers 3A, 3B according to the first and second embodiments in that two cords 2A, 2B pass therethrough. The cords 2A, 2B are drawn outward of the housing member proper 31 through the hole 39C (the opposed hole not shown) formed through the opposed side walls 34, 35.

The number of the cords may be three or more. In this case, one cord can be drawn through each of the side walls 32 through 35 and the bottom wall 36. Alternatively, two cords or more may be drawn out through any one side wall.

Figure 10:
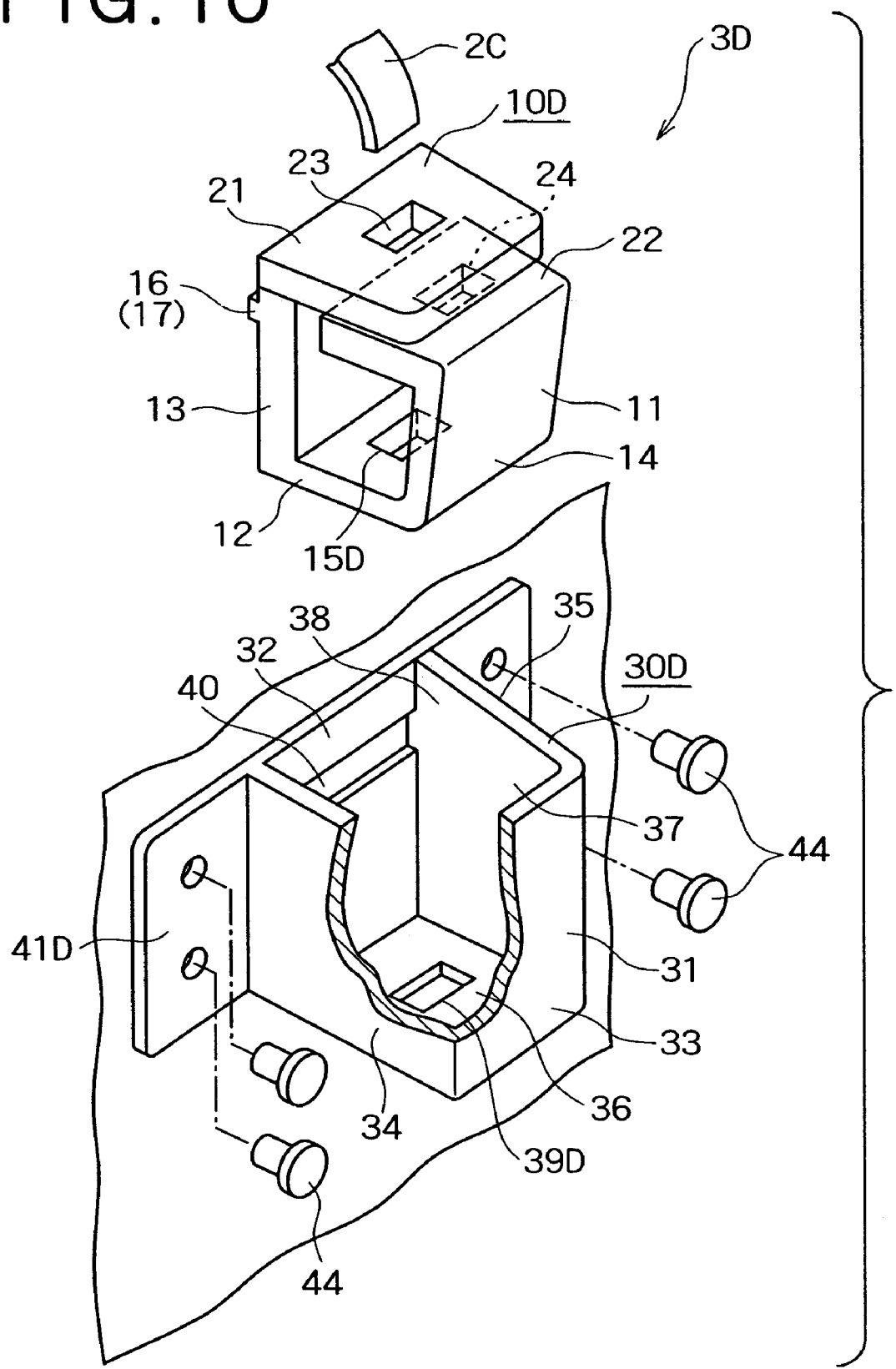
FIG. 10 is an exploded perspective view showing a cord stopper according to the fourth embodiment of this invention.

FIG. 10 shows the fourth embodiment of this invention. FIG. 10 is an exploded perspective view showing a cord stopper 3D according to the fourth embodiment of the invention.

The cord stopper 3D according to the fourth embodiment is intended to come into or out of engagement with a flat ribbon or strip 2C instead of a cord 2. For this purpose, the slits 23, 24 are rectangular so as to match the cross-sectional shape of the ribbon 2C. Furthermore, the fourth embodiment is different from the first embodiment in that a cord-inserting hole 15D is formed through the connecting wall 12 and a hole 39D is formed through the bottom wall 36 of the housing member 30D.

Another difference is that the attaching rim 41D of the housing member 30D is attached to the article 1 by means of rivets 44. For this reason, the attaching rim 41D has no groove 42 formed for permitting stitches to run therealong.

Figure 11:
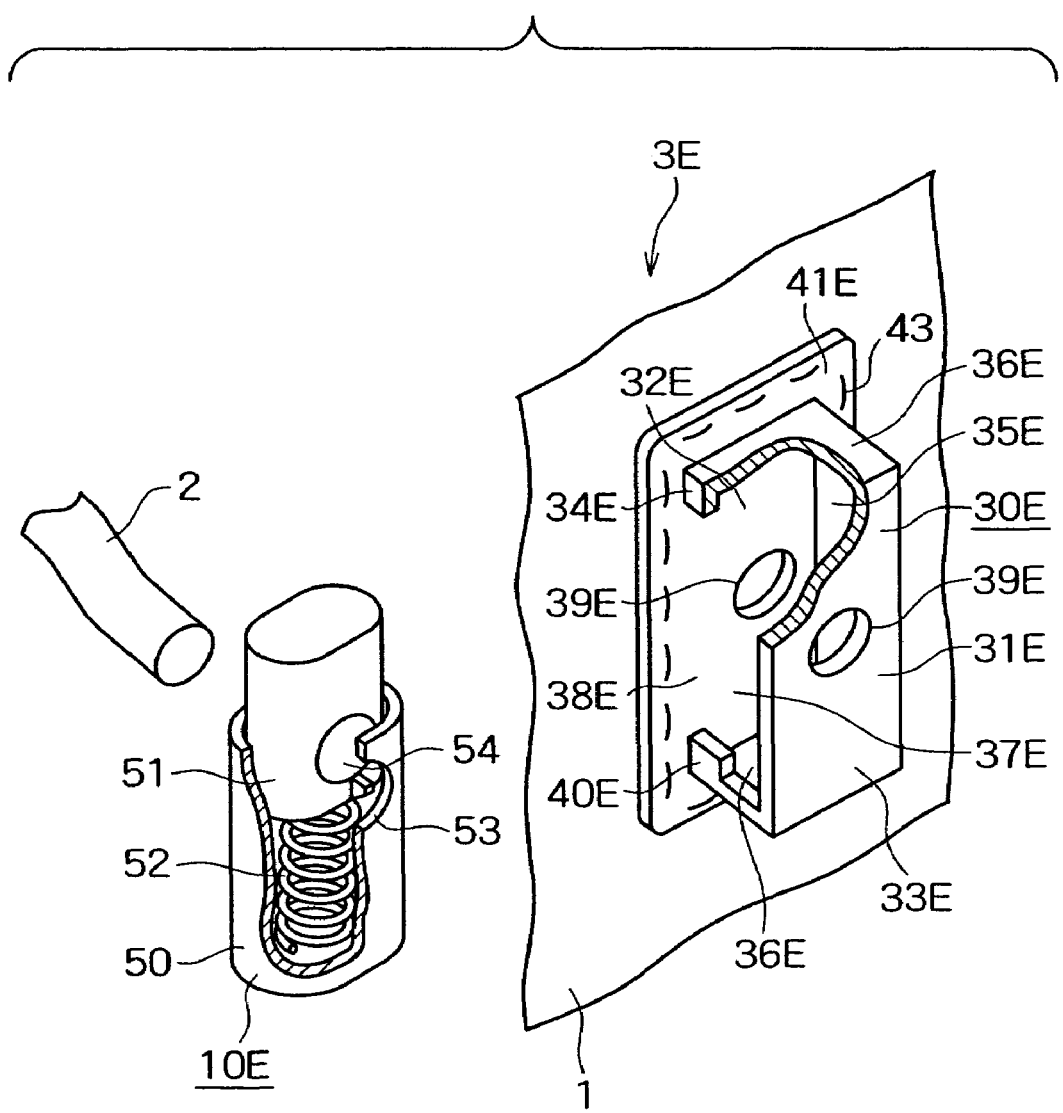
FIG. 11 is an exploded perspective view showing a cord stopper according to the fifth embodiment of this invention.
Figure 12:
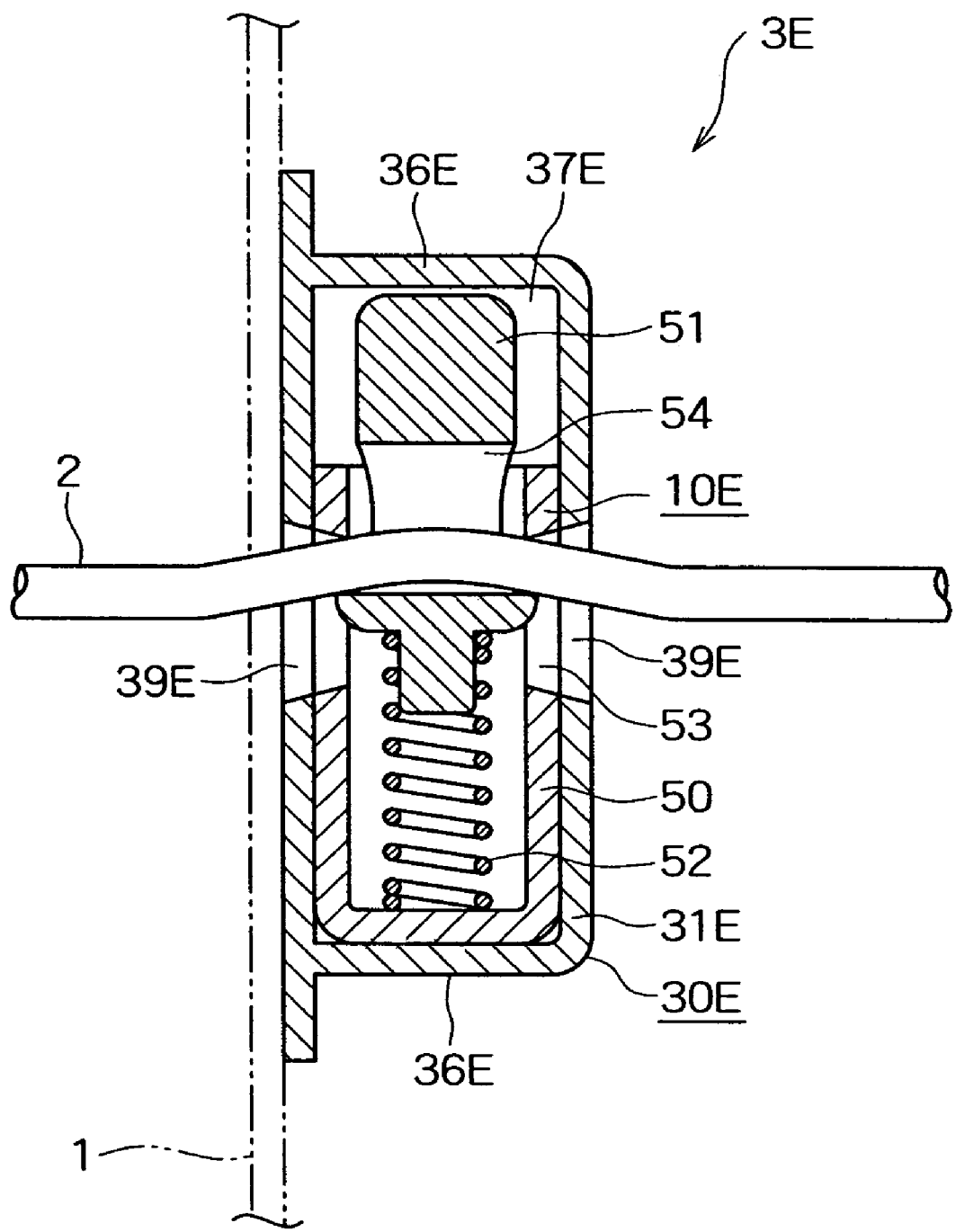
FIG. 12 is a cross-sectional view of the fifth embodiment of this invention, showing the locking member housed in the housing member.
Figure 13:
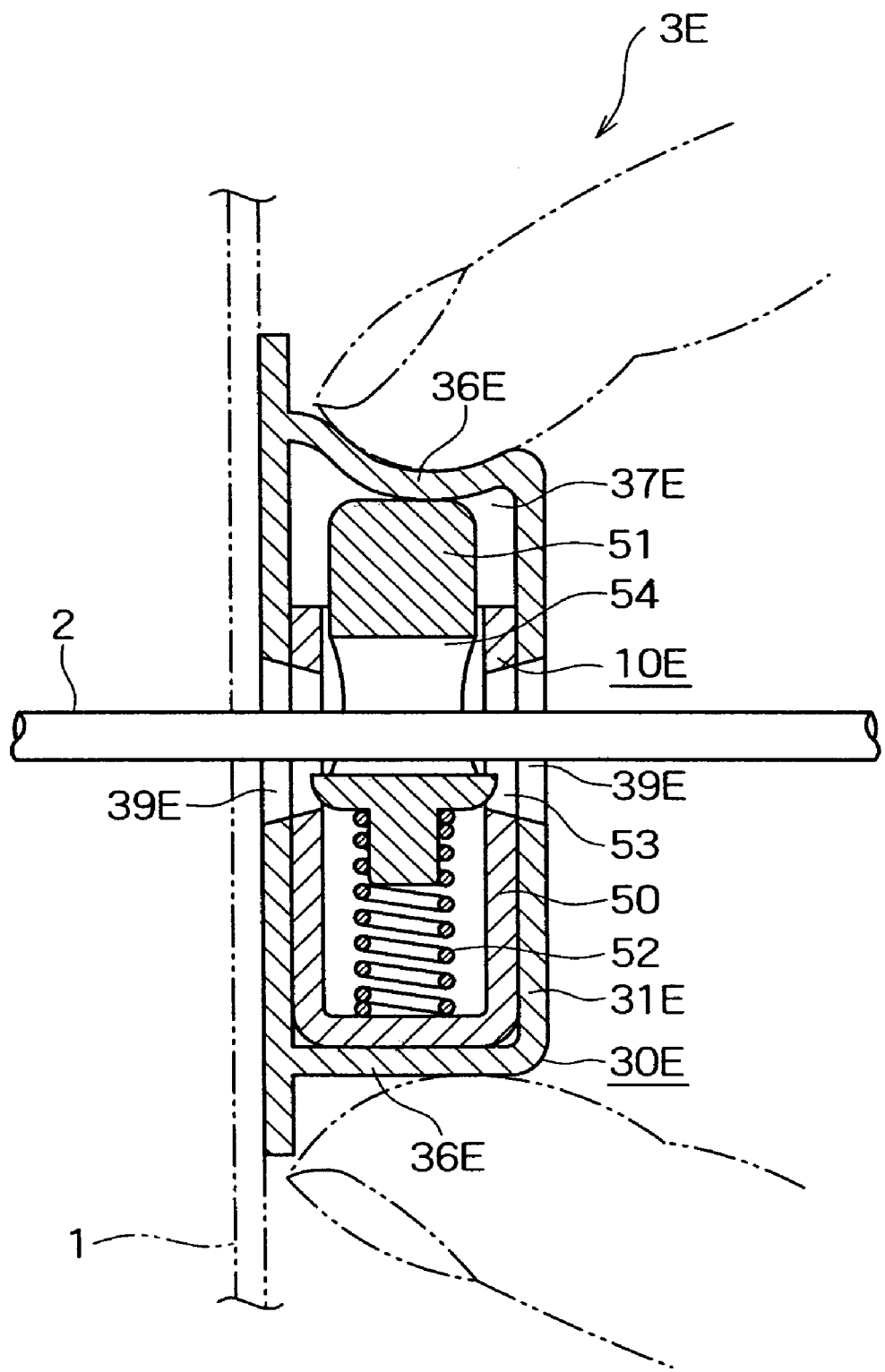
FIG. 13 is a view similar to FIG. 12, showing how to bring the cord out of engagement with the cord stopper.

FIGS. 11 through 13 show the fifth embodiment of the present invention.

FIG. 11 is an exploded perspective view showing a cord stopper 3E according to the fifth embodiment.

The cord stopper 3E according to the fifth embodiment differs from the cord stopper 3A according to the first embodiment in the following constructions of the locking member 10E and the housing member 30E.

The locking member 10E is comprised of a cylindrical socket 50 having an opening formed at one end, a plug 51 reciprocally disposed within the cylindrical socket 50, urging means such as a coil spring seated on the inner bottom of the socket 50 and adapted for urging the plug 51 in the direction tending to come out of the socket 50 and cord-inserting holes 53, 54 formed through the socket 50 and the plug 51, respectively. The coil spring 52 used as the urging means may be replaced by a resilient leg formed integrally at the lower end of the plug 51 and abutting on the inner bottom of the socket 50 so as to urge the plug 51 in the direction of tending to bring the plug 51 out of the socket 50.

The housing member 30E is comprised of a housing member proper 31E adapted for housing the locking member 10E therein and an attaching rim 41E integrally formed along the outer edges of the housing member proper 31E. In addition to the first through the fourth side walls 32E~35E, the housing member proper 31E includes first and second bottom walls 36E, 36E serving as a first elastically deformable portion, thus defining a rectangular parallelepiped housing space 37E therein. The first bottom wall 36E, the first side wall 32E and the third side wall 34E are opposed to the second bottom wall 36E, the second side wall 33E and the fourth side wall 35E, respectively. A pair of opposed holes 39E are formed in the first and second side walls 32E, 33E in opposed relation to each other. The third side wall 34E has an opening 38E formed therethrough for inserting the locking member 10E into the housing member proper 31E therethrough. Furthermore, the side wall 34E has a locking projection 40E formed on the lower edge thereof so as to project within the opening 38E and retain the locking member 10E in the housing space 37E of the housing member 30E. The attaching rim 41E is shown to have no groove formed therein, but a groove 42 may be formed along the attaching rim 41E.

FIG. 12 is a cross-sectional view showing the locking member 10E housed in the housing member 30E.

When the locking member 10E is housed in the housing member 30E, the plug 51 is urged by the coil spring or the urging means 52 in the direction of tending to come out of the socket 50 so that the cord-inserting holes 54 and 53 of the plug 51 and the socket 50 are out of registry with each other. The overlap of the cord-inserting holes 54, 53 becomes less than the thickness of the cord 2, thus constraining or retaining the cord 2 thereat.

FIG. 13 is a cross-sectional view of the locking member 10E housed in the housing member 30E, showing the way of bringing the cord 2 out of engagement with the cord stopper 3E.

In order to bring the cord 2 out of engagement with the cord stopper 3E, the bottom walls 36E, 36E of the housing member proper 31E and hence the plug 51 of the locking member 10E housed therein are compressed together against the resiliency of the coil spring 52. Specifically, when the bottom walls 36E, 36E of the housing member proper 31E are compressed, the bottom wall 36E elastically deforms into the housing member proper 31E. When the bottom walls 36E, 36E of the housing member proper 31E thus deforms, the plug 51 of the locking member 10E housed in the housing member proper 31E advances downwards into the socket 50. Then, the overlap of the cord-inserting holes 54 and 53 of the plug 51 and the socket 50 becomes greater than the thickness of the cord 2, thus permitting the cord 2 to freely pass through the overlap.

Once the cord stopper 3E is released, the plug 51 comes back into its original position under the resiliency of the coil spring 52. Since the plug 51 comes back into the original position indicated in the FIG. 12, the cord 2 is constrained or firmly retained at this position.

This invention is not limited to the embodiments mentioned above, but may include any variations and improvements as far as they can accomplish the objects of this invention.

The constructions of the locking member 10A~10E are not limited to the constructions of the locking members according to the first through fifth embodiments but may include other constructions, as far as they can come into engagement with the cord 2, 2A, 2B, 2C and, when pressed, come out of engagement therewith.

The constructions of the housing member 30A~30E are not limited to the constructions of the housing locking members according to the first through fifth embodiments but may include other constructions, as far as they fulfill the following conditions. The housing member 30A~30E must have the housing member proper 31, 31E which has the housing spaces 37, 37E enough to substantially accommodate the locking member 10A~10E. In addition, the housing member 30A~30E must only have the first elastically deformable portion transmitting the pressure to the locking member 10A~10E through the outer wall of the housing space 37, 37E.

In referring to "the housing spaces 37, 37E enough to substantially accommodate the locking member 10A~10E" above, it means that the housing space 37, 37E does not necessarily accommodate the whole of the locking member 10A~10E but part of the locking member 10A~10E may be exposed out of the housing space 37, 37E. If part of the locking member 10A~10E that is exposed beyond the housing space 37, 37E is shaped integral and continuous to the contour of the housing members 30A~30E, that part will never catch any extraneous thing, so that such a cord stopper can enjoy the same effects.

According to the first through fifth embodiments, the housing members 30A~30E are made of relatively soft and elastic materials such as polyurethane elastomer, polyolefin elastomer, polyester elastomer, etc., thus constituting the first elastically deformable portion, so that the pressure applied to the housing member 30A~30E can be transmitted to the locking members 10A~10E through the outer walls of the housing space 37. Instead of making the housing members 30A~30E of the above-mentioned materials, that part of the housing member proper 31, 31E to which pressure is applied may be thinned. The thus thinned part of the housing member proper 31, 31E constitutes the first elastically deformable portion.

A finger grip portion may be attached to the outer surface of that part of the housing member proper 31, 31E to which pressure is applied. If the wearer grips the housing member proper 31 with his fingers contacting the finger grip portion, he can compress the housing member proper 31 at the right positions. If the finger grip portion has a concave recess, the fingers are guided more easily or reliably by the concave recess into the right position. Furthermore, if the finger grip portion has a rugged outer surface, the fingers will never slip when compressing the housing member proper 31, so that the wearer can effect more reliable compression on the housing member proper 31.

According to the first through fourth embodiments, the locking hole 40 (the hole 39) and the locking ridges 16, 16B constitute the retaining means 17. The locking hole 40 (the hole 39) are formed in the housing member 30A~30D, while the locking ridges 16, 16B are formed on the locking member 10A~10D. This arrangement may be reversed, that is, the locking hole 40 (the hole 39) may be formed in the locking member 10A~10D, while the locking ridges 16, 16B may be formed on the housing member 30A~30D. Even with the reversed arrangement, the same effects can be enjoyed.

According to the first through third embodiments and the fifth embodiment, the attaching rim 41, 41E is sewn or attached to the article 1 by means of stitches 43 running along the groove 42 of the attaching rim 41, 41E. According to the fourth embodiment, the attaching rim 41D is attached to the article 1 by means of rivets. The attaching means is not limited to those specifically explained above. The outer surface of the attaching rim 41 (41D, 41E) may be welded or adhered to the article 1, in which cases the attaching rim 41 need not have a groove 42 formed.

CONCLUSIONS, RAMIFICATIONS, AND SCOPE

This invention can be used for a cord stopper by which a cord can be retained at its any position to an article such as a garment, and for a cord stopper which can be used for closing bags or packing cargoes.

With the construction according to this invention, when the locking member is housed in the housing space of the housing member, the locking member is fully enclosed by the housing member, so that the locking member is less likely to touch or catch extraneous things and to be damaged thereby. In addition, the cord stopper can enjoy an advantageous effect of being attractive in appearance.

Furthermore, when the housing member proper is compressed in order to bring the cord into and out of engagement with the cord stopper, the housing member elastically deforms. Then, pressure is transmitted to the locking member through the outer wall of the housing member proper, so that the cord comes out of engagement with the cord stopper. As soon as the housing member is released, the deformed outer wall of the housing member proper restores into the original position under its resiliency, then the cord is constrained or retained by the locking member. Consequently, the cord stopper can come into and out of locking engagement with the cord without any difficulty and is thus less likely to be damaged when it is operated, and furthermore it is attractive in appearance.

Since the housing member is attached to the article, the cord stopper will not dangle and thus has no problem attended with dangling.

The cord stopper of the invention preferably has a retaining means for firmly retaining the locking member within the housing member proper.

With this construction, when the locking member is housed in the housing member proper, the locking member is firmly retained within the housing member proper by the retaining means, so that the locking member is well prevented from accidentally coming out of the housing member proper.

The retaining means is not limited to the construction of comprising a locking hole formed in one of the locking member and the housing member and a locking ridge formed in another one of the locking member and the housing member. Alternatively, the retaining means may be constructed such that the housing space is made of an elastic member with an inner shape which is slightly less than the outer shape of the locking member.

With this construction, once the locking member is housed in the housing space, the housing space stretches and intimately touches the outer surface of the locking member. The resiliency of the elastic member enables the housing member proper to more reliably retain the locking member therein. Thus, the locking member is prevented from accidentally coming out of engagement with the housing member proper.

In the cord stopper according to this invention, the retaining means preferably comprises a locking hole formed in one of the locking member and the housing member and a locking ridge formed on another one of the locking member and the housing member; the locking ridge being adapted for coming into locking engagement with the locking hole when the locking member is housed in the housing member proper.

With this construction, when the locking member is housed in the housing member proper, the locking ridge comes into locking engagement with the locking hole, so that the locking member is securely housed in the housing member proper. Therefore, the locking member is surely prevented from accidentally coming out of engagement with the housing member proper.

In the cord stopper according to this invention, the housing member preferably has an attaching rim formed on the edge of the housing member proper and adapted for attaching the housing member to the article.

With this construction, the housing member can be easily and reliably attached to the article thanks to the presence of the attaching rim. For example, the housing member can be attached to the article by attaching the attaching rim to the article by means of stitches, rivets, adhesive or welding.

In the cord stopper according to this invention, the locking member preferably comprises a pair of clamping plates having cord-inserting slits respectively and partly overlapped to each other and the second elastically deformable portion for deforming the pair of clamping plates in the direction tending to bring the cord-inserting slits into registry with each other when the locking member is pressed, the pair of clamping plates and the second elastically deformable portion being formed integrally with each other.

With this construction, the locking member is comprised of the pair of clamping plates and the second elastically deformable portion integrally formed with each other. The locking member to be housed in the housing member proper can be constructed as one thing, so that the cord stopper can be made compact.

The housing member proper preferably has an opening through which the locking member is housed into the housing member proper, the opening being closed by the locking member when the locking member is housed in the housing member proper.

With this construction, once the locking member is housed into the housing member proper through its opening, the opening is fully closed by the locking member, so that there remains no recess in the housing member proper. As a result, the cord stopper will never catch extraneous things and thus is less likely to be damaged.

Although the description above contains many specificities, these should not be construed as limiting the scope of the invention but as merely providing illustrating of some of the presently preferred embodiments of this invention.

Thus, the scope of the invention should be determined by the appended claims and their legal equivalents, rather than by the examples given.

What is claimed is:

1. A cord stopper comprising a locking member made of relatively rigid material and adapted to be normally in locking engagement with a cord and, when the locking member is pressed, to come out of locking engagement with the cord, and the locking member further comprising a pair of clamping plates having cord-inserting slits formed respectively therein and normally disposed out of registry with each other, and a second elastically deforming portion adapted to displace the pair of clamping plates in the direction tending to bring the cord-inserting slits into registry with each other when the locking member is pressed, the pair of clamping plates and the second elastically deforming portion being formed integrally with each other; and a housing member made of relatively soft material and including a housing member proper adapted for housing the locking member therein and attached to an article; the housing member proper having a housing space large enough to accommodate the locking member; wherein pressure applied to the housing member proper can be transmitted to the locking member through an outer wall at least partially defining the housing space to thus deform the locking member and bring the locking member out of locking engagement with the cord.

2. A cord stopper comprising according to claim 1, a locking member made of relatively rigid material and adapted to be normally in locking engagement with a cord and, when the locking member is pressed, to come out of locking engagement with the cord; and a housing member made of relatively soft material and including a housing member proper adapted for housing the locking member therein and attached to an article;

the housing member proper having a housing space large enough to accommodate the locking member; wherein pressure applied to the housing member proper can be transmitted to the locking member through an outer wall at least partially defining the housing space to thus deform the locking member and bring the locking member out of locking engagement with the cord, and the housing member proper further comprising a first through fourth side walls and a bottom wall formed on the upper or lower ends of the four side walls to thus define a housing space thereamong, the housing space having an opening formed at the end opposite to the bottom wall and adapted to insert the locking member into the housing space therethrough; the locking member including a U-shaped second elastically deforming portion having a bottom connecting wall and two opposed side walls connected at their respective lower ends by the bottom connecting wall and a pair of clamping plates provided on the opposed ends of the locking body so as to be bent towards the respective other ends, the clamping plates having cord-inserting slits formed therein; the side walls of the housing member facing the side walls of the locking member being opposed to each other, with the housing space interposed therebetween.

* * * * *